United States Patent
Cherubini

(10) Patent No.: US 6,735,221 B1
(45) Date of Patent: May 11, 2004

(54) COMMUNICATION NETWORK SYSTEM

(75) Inventor: Giovanni Cherubini, Rueschlikon (CH)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/478,563

(22) Filed: Jan. 6, 2000

Related U.S. Application Data
(60) Provisional application No. 60/116,137, filed on Jan. 11, 1999.

(51) Int. Cl.$^7$ .................................................. H04J 1/00
(52) U.S. Cl. ................... 370/485; 370/486; 370/208; 370/210; 370/443; 375/260; 375/346; 708/403; 708/404
(58) Field of Search ................................. 370/210, 211, 370/209, 208, 207, 206, 485, 480, 486, 431, 489, 443, 461, 465, 348; 375/260, 261, 346; 455/3.04, 3.05, 3.06; 348/348; 708/403, 404; 725/111, 122, 126, 105

(56) References Cited

U.S. PATENT DOCUMENTS

| | | | | |
|---|---|---|---|---|
| 5,345,439 A | * | 9/1994 | Marston | 370/210 |
| 5,953,344 A | * | 9/1999 | Dail et al. | 370/443 |
| 6,370,153 B1 | * | 4/2002 | Eng | 370/489 |
| 6,469,991 B1 | * | 10/2002 | Chuah | 370/347 |
| 6,567,416 B1 | * | 5/2003 | Chuah | 370/347 |

\* cited by examiner

*Primary Examiner*—Ajit Patel
*Assistant Examiner*—Chuong Ho

(74) *Attorney, Agent, or Firm*—Thomas A. Beck; Louis P. Herzberg

(57) ABSTRACT

A digital communications network system for multiple access has a head-end node and at least one station node at at least one other end node; the system comprises a head-end controller (3) capable of transmitting data and medium-access control information to at least one station (6), preferably a plurality of station means, over a set of downstream channels within a first frequency range, and receiving information from the station or stations over an upstream channel within a second frequency range; the upstream channel comprises at least one upstream subchannel, preferably a plurality of upstream subchannels; the system further comprises at least one connection, preferably a plurality of connections, for connecting the head-end controller with the station or stations; each station includes means for receiving data and medium-access control information from the head-end controller; further means are provided for sending a data stream at a first signal level over at least one upstream subchannel, preferably a plurality of upstream subchannels; the station further includes means for sending at least one ranging request message to the head-end controller over at least one upstream subchannel; the ranging request message of messages has/have a signal level that is lower than the first signal level of the data stream; the ranging request message or messages is/are being transmitted using repetition coding enabling the head-end controller to detect the ranging request message or messages having a signal level lower than the first signal level of the data stream; the repetition coding is selected for enhancing the level of spectral containment of the ranging request message(s) and for reducing interference with transmission over adjacent upstream subchannels.

14 Claims, 13 Drawing Sheets

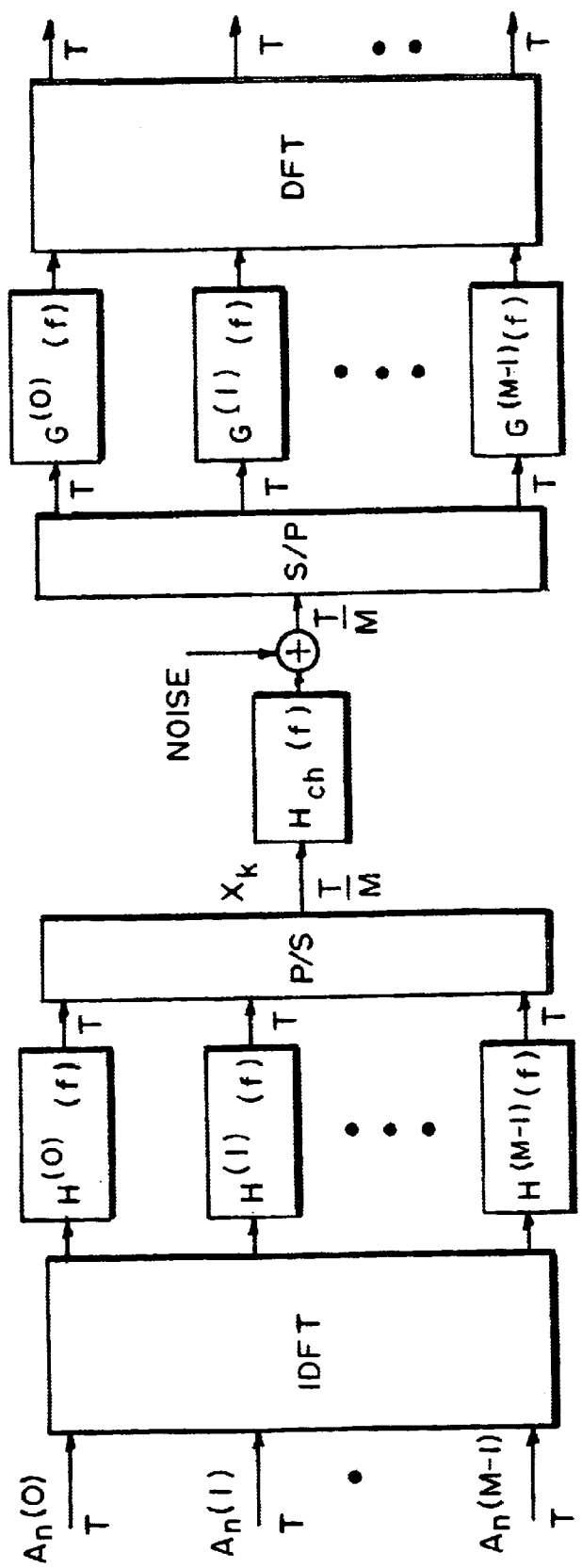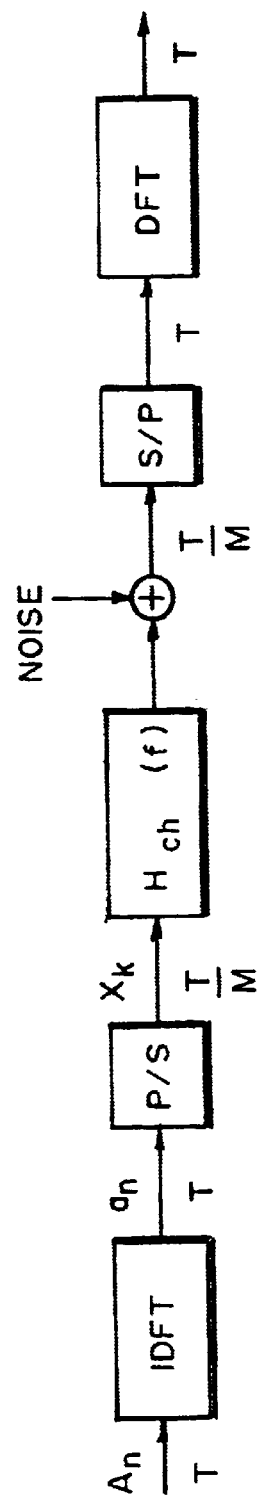
FIG.3
FIG.4

COMMUNICATION NETWORK SYSTEM

This application claims the benefit of provisional application 60/116,137 filed Jan. 11, 1999.

BACKGROUND OF THE INVENTION

The invention relates to a digital communication network system for multiple access system, in which a head-end controller (HC) sends data and medium-access control (MAC) information over a set of downstream channels to several stations, and these stations send information to the HC over a set of shared upstream channels.

The present application is related to the following applications even dated herewith: application Ser. No. 09/478,564, entitled "Filtered Multitone Transmission with Application to DSL Technologies" by inventors G. Cherubini, et al., application Ser. No. 09/478,565, entitled "Hybrid TDMA/CDMA System Based on Multitone Modulation" by inventors G. Cherubini, et al. which are incorporated herein by reference.

PRIOR ART

Digital communications network systems for multiple access in which a HC broadcasts data and MAC information over a set of downstream channels to several channels are believed to be the emerging two-way hybrid fiber/cable (HFC) systems (cf. E.g. MCNS Interim Specification "Data over Cable Interface Specifications-Radio Frequency Interface Specification" MCNS Holding, L. L. Mar. 26, 1997) as well as their wireless counterparts, i.e., multichannel multipoint distribution service (LMDS) (c.f.e.g. Honcharenko, W. et al., "Broadband Wireless Access" IEEE Comm. Mag., pp 128–135 (January 1997).

Specifically a hybrid fiber/coax (HFC) system is a point to multipoint, tree ans branch access network in the downstream direction, with downstream frequencies in the 50–860 MHz band, and a multipoint to point, bus access network in the upstream direction, with upstream frequencies in the 5–42 MHz band.

Prior-art systems include means for downstream transmission using an HC modem transmitter and station modem receiver; these systems have some technical challenges due to transmission rates in the order of 30 to 45 Mbit/s per downstream channel. However, owing to the continuous broadcast mode of downstream transmission over a channel with low distortion and high signal-to-noise ratio, (typically $\geq 42$ dB in an HFC network by regulation) well known signal processing techniques can be applied. In the downstream direction, continuous broadcast operation is specified. The ITU J.83 recommendation defines two transmission schemes by which data rates in the range of 30–45 Mbit/s are achieved on 6 or 8 MHz channel bandwidths, with spectral efficiencies of 5–8 bits/s/Hz (cf. E.g., ITU Recommendations J.83).

In the upstream direction, implementation of physical (PHY) layer transmission and MAC layer functions pose considerable technical challenges. Firstly, because signals are transmitted in bursts, HC receivers with fast synchronization capabilities are essential. Secondly, individual station signals must be received at the HC at defined arrival times and power levels. Therefore, determination of the round-trip delay between the HC and each individual station and individual transmit power control for each station to compensate for widely varying attenuations in the upstream direction are important functions. Thirdly, the upstream channel is generally much more noisy and subject to distortion than the downstream channel. The required measurements and control actions to set upstream transmission parameters and round-trip delay compensation values are part of the registration process, which is performed when a station begins to participate in upstream transmission.

OBJECTS AND SUMMARY OF THE INVENTION

Now, the object of the present invention is a digital communication network system for multiple access with ranging and power adjustment of stations, where upstream transmission is based on multi-carrier modulation using orthogonal frequency division multiplexing (OFDM) such that transmission of a not yet registered station over a subchannel does not disturb the transmission of other stations over adjacent subchannels.

A further object of the invention is a digital communication network system specified above, which includes means at a station to send a ranging request message over a subchannel at a signal level such that said ranging request does not disturb enables a head-end controller means for detecting a ranging request message.

These objects and further advantages will be achieved according to the invention by a novel digital communication network system for multiple access with ranging and power adjustment of a station, at which a passband OFDM transmission technique yielding a high level of spectral containment of individual subchannels is employed for upstream transmission; during transmission of ranging request messages, the high level of spectral containment of individual subchannels is further increased by repetition coding, and/or by signal filtering.

According to a first general embodiment, the invention provides for a communications network system for multiple access having a head-end node and at least one station node, said system comprising a head-end controller (HC) means capable of transmitting data and medium-access control information to at least one station means, preferably a plurality of station means, over a set of downstream channels within a first frequency range, and receiving information from said plurality of station means over an upstream channel within a second frequency range, said upstream channel comprising a set of upstream subchannels, which system further comprises at least one first connection cable means for connecting said head-end controller means with at least one cable node means, and at least one second connection cable means for connecting said at least one cable node means with said plurality of stations means, wherein each of said station means including means for receiving data and medium-access control information from said head-end controller means, further including means for sending a data stream at a first signal level over at least one upstream subchannel, which station means further including means for sending at least one ranging request message to said head-end controller means over at least one upstream subchannel, said at least one ranging request message having a signal level that is lower than said first signal level of said data stream, and said at least one ranging request message being transmitted using repetition coding, so as to enable said head-end controller means for detecting said at least one ranging request message at a signal level such that said message does not disturb transmission over other upstream subchannels.

According to a second general embodiment, the invention provides for a communications network system for multiple access having a head-end node and at least one station node, said system comprising a head-end controller (HC) means capable of transmitting data and medium-access control information to at least one station means, preferably a plurality of station means, over a set of downstream channels within a first frequency range, and receiving information from said plurality of station means over an upstream channel within a second frequency range, said upstream channel comprising a set of upstream subchannels, which system further comprising at least one first connection cable means for connecting said head-end controller means with at least one cable node means, and at least one second connection cable means for connecting said at least one cable node means with said plurality of station means, wherein each of said station means including means for receiving data and medium-access control information from said head-end controller means, further including means for sending a data stream at a first signal level over at least one upstream subchannel, which station means further including means for sending at least one ranging request message to said head-end controller means over at least one upstream subchannel, said at least one ranging request message having a signal level that is lower than said first signal level of said data stream, and said at least one ranging request message being transmitted using signal filtering means, so as to enable said head-end controller means for detecting said at least one ranging request message at a signal level such that said message does not disturb transmission over other subchannels.

Generally, the spectrum of the noise in prior art systems of the type of interest herein suggests that upstream transmission must have an inherent capability of frequency-agile operation with various modulation rates and spectral efficiencies. In the above-mentioned MCNS Interim Specification, single-carrier QAM with 4 or 16-point constellations is defined. Carrier frequency, modulation rate, and spectral efficiency are selected by the HC and are sent as MAC information to the stations. Also, modulation rates up to 2:560 MBaud are defined. The receivers of upstream modems, also known as frequency-agile multimode modems, must have burst-synchronization as well as equalization capability (cf. e.g. Chevillat P. R. et al, IEEE Trans.Comm. vol COM-35, pp 869–876 (September 1987).

Transmission schemes based on single-carrier quadrature-amplitude modulation (QAM) could represent a viable solution for upstream transmission. However these schemes are generally less efficient and robust in the presence of impulse noise and narrow-band interference than multicarrier modulation techniques, also known as orthogonal frequency division multiplexing (OFDM). OFDM schemes are therefore considered for upstream transmission in next-generation multiple-access systems.

When a station becomes active, it will first tune its receiver to a downstream channel in which the HC sends MAC information, in addition to data. The station monitors the downstream MAC information for an invitation to register with the HC. Ranging and power adjustment take place in the course of the registration process, during which the station does not have knowledge of the correct transmit power setting and round-trip delay compensation. If single-carrier QAM is employed for upstream transmission, interference between signals on different subchannels is avoided, because the sufficiently large subchannel bandwidths prevent spectral overlap. If OFDM is employed for upstream transmission, spectral overlap between signals on adjacent subchannels can occur, and subchannel signals received with improper timing phase can generate inter-channel interference (ICI).

For the purpose of understanding the invention, the registration process of a cable modem based on QAM, as specified in the above-mentioned MCNS Interim Specification, will now be explained is some detail.

Upstream transmission is divided into a stream of mini-slots. Each mini-slot is numbered relative to a master reference clock maintained by the HC. The HC distributes timing information to the cable modems by means of Time Synchronization (SYNC) messages, which include time stamps. From these time stamps, the stations establish a local time base slaved to the time base of the HC. For upstream transmission, access to the mini-slots is controlled by Allocation Map (MAP) messages, which describe transmission opportunities on upstream channels. A MAP message includes a variable number of information elements (IE), each defining the modality of access to a range of mini-slots in an upstream channel. Each station has a unique IEEE 48-bit address. In addition, an active station will be associated with 14-bit service identifiers (SID), one SID for each service requested.

At the beginning of the registration process, a station tunes its receiver to a down-stream channel over which it receives SYNC messages from the HC. The acquired local time base is retarded by the propagation delay from the HC to the station. The cable modem then monitors the downstream channel until it receives a MAP message with an Initial Maintenance IE, which specifies a time interval during which new stations may send a Ranging Request (RNG-REQ) message to join the network. The duration of the initial maintenance interval is equivalent to the maximum round-trip delay plus the transmission time of a RNG-REQ message. At the time specified in the MAP message, the station then sends a first RNG-REQ message at lowest transmit power level or a power level remembered from previous transmissions available in a non-volatile memory. A zero SID identifies the station as a joining station.

If the cable modem does not receive a response within a time-out period, either the RNG-REQ messages from multiple modems have collided, or the employed transmit power level was too low. To reduce the probability of repeated collisions, for collision resolution a random backoff protocol is employed. After a backoff time interval has elapsed, the station looks for a new MAP message with an Initial Maintenance IE, and at the specified time retransmit a RNG-REQ message with increased transmit power level. These steps are repeated until the HC eventually detects a RNG-REQ message, from which the HC can determine the round-trip delay and the power correction value to be used by the cable modem for future upstream transmission. In particular, the round-trip delay compensation is determined such that, when the round-trip delay compensation is applied in the station, future upstream transmissions of this station arrive at defined time instants (epochs) at the HC. The HC sends the round-trip delay compensation and the transmit power adjustment value for future transmission to the station in a Ranging Response (RNG-RSP) message. The RNG-RSP message also includes a temporary SID.

The station then waits for a MAP message containing a Station Maintenance IE individually addressed to this station via the station's temporary SID. The station responds with another RNG-REQ message containing the temporary SID and using the power level and round-trip delay corrections. The HC returns another RNG-RSP message to the station with additional information for fine tuning the power adjustment and round-trip delay compensation values. The ranging request/response steps are repeated until the HC sends a Ranging Successful notification. At this point, the station can issue a Registration Request (REG-REQ) message. The HC answers with a Registration Response (REG-RSP) message that confirms the modem registration and specifies one or more SIDs to be used by the cable modem during subsequent upstream transmission.

Further, a known modulation technique based on OFDM will now be explained: in this technique, blocks of M symbols are transmitted in parallel over M subchannels by employing M orthogonal subcarriers. OFDM signals are usually treated as baseband signals in the fundamental frequency band $$\left[-\frac{M}{2T}, \frac{M}{2T}\right],$$

where T denotes the modulation interval. In HFC networks the baseband signals must be translated to a carrier frequency $f_c$ before transmission.

An OFDM system as represented by the block diagram shown in FIG. 1 will now be considered. The sequence of blocks of complex input symbols at the modulation rate 1/T is represented by $\{A_n\}$, where the vector $A_n = \{A_n(f), i=0, \ldots, M-1\}$ denotes the block of symbols transmitted in the n-th modulation interval. Conceptually, the factor-M upsamplers in FIG. 1 insert M−1 zeros between the symbols in each of the M symbol sequences. These sequences at the rate M/T are convolved with the impulse response $h_k(f)$, $i=0, \ldots, M-1$, of M filters with spectral responses given by $H_i(f) = \Sigma e^{-j2\pi fkT\ IM}\ h_k^{(i)}, i=0, \ldots, M-1$. The OFDM signal $x_k$ is given by the addition of the filter output signals, and is expressed by $$x_k = \sum_{n=-\infty}^{\infty} \sum_{m=0}^{M-1} A_n(m) h_{k-nM}(m) \qquad (1).$$

The received signal is filtered by the bank of M filters with impulse responses $g_k(i)$, $i=0, \ldots, M-1$, whose frequency responses are $G_i(f)$, $i=0, \ldots, M-1$. The filter output signals are sampled at the modulation rate 1/T, and the samples are used to determine a reliable estimate of the sequence of transmitted symbols. To ensure that transmission free of intersymbol interference (ISI) within a subchannel, as well as free of ICI between subchannels is achieved, a generalized Nyquist I criterion must hold. Assuming that the channel is ideal with frequency response $H_{ch}(f)=1$, and that the transmit and receive filters satisfy the symmetry conditions $g_k(i)=h_{-k}^*i=0, \ldots, M-1$, where the asterisk denotes complex conjugation. Then the generalized Nyquist I criterion in the time domain is given by $$\sum_k h_k(i) h_{k-nM}^*(j) = \delta_{i-j} \delta_n, 0 \le i, j \le M-1, \qquad (2)$$

where $\delta_i$ is defined as the Kronecker delta. The elements of a set of orthogonal filter impulse responses that satisfy equation (2) are sometimes referred to as "wavelets".

For large M, a simple implementation of an OFDM system as shown in FIG. 1 would require an exceedingly large computational complexity, since all the filtering operations are performed at the high rate M/T. The complexity of an OFDM system, however, can be substantially reduced by resorting to the polyphase implementation of a uniform filter bank, where filtering operation are performed by frequency-shifted versions of a baseband prototype filter. To derive the efficient implementation, the scheme depicted in FIG. 2(a) is considered, where H(f) and G(f) denote the frequency responses of the prototype filters for the transmit and receive filter banks, respectively. Assume the M carrier frequencies are given by $f_i = i/T$, $i=0, \ldots, M-1$. We consider FIR transmit and receive prototype filters with impulse responses that have equal length $\Box M$, i.e., $h_k \ne 0$, if $k=0, \ldots, \gamma M-1$, $h_k=0$, otherwise, and that satisfies the condition $g_k = h_{\gamma M-1-k}^*$. Then the scheme of FIG. 2(a) is equivalent to that of FIG. 2(b), and can therefore be regarded as a special case of the general OFDM system given in FIG. 1. The OFDM signal $x_k$ at the transmitter output is given by $$x_h = \sum_{m=0}^{M-1} e^{j2\pi \frac{m}{T}\frac{kl'}{M}} \sum_n h_{k-nM} A_n(m) \qquad (3)$$

We let $k = lM + i$, $0 \le i \le M-1$, to obtain $$x_{lM+i} = \sum_{m=0}^{M-1} e^{j2\pi \frac{m}{\gamma} iT} e^{j2\pi \frac{m}{T} \frac{iT}{M}} \sum_k h_{(l-n)M+i} A_n(m). \qquad (4)$$

If we observe $$e^{j2\pi \frac{m}{T} iT} = 1,$$

let $x_l^{(i)} = x_{lM+i}$, $h_l^{(i)} = M h_{lM+i}$ and interchange the order of summation, we get $$x_l^{(i)} = \sum_n h_{l-n}^{(i)} \frac{1}{M} \sum_{m=0}^{M-1} W^{-mi} A_n(m), \qquad (5)$$

where $$W = e^{-j\frac{2\pi}{M}}.$$

The filtering elements with impulse responses $h_l^{(i)}$, $i=0, \ldots, M-1$, are known as the polyphase components of the prototype filter. The frequency responses of the polyphase components are denoted by $H^{(i)}(f)$, $i=0, \ldots, M-1$. Recalling that the M×M inverse discrete Fourier transform (IDFT) matrix is defined as $$\mathcal{T}_M^{-1} = \frac{1}{M}[W^{-mi}],$$

m,i=0, ..., M−1, we find that the inner sum in Eq. (5) yields the i-th element of the IDFT of the vector $A_M$, given by $\mathcal{T}_M^{-1} A_n = a_n = \{a_n(i), i=0, \ldots, M-1\}$. Therefore the transmit filter bank of the system shown in FIG. 2(a) can be implemented by an IDFT followed by an M-branch polyphase network and a parallel-to-serial (P/S) converter. In a similar manner the receive filter bank can be implemented by a serial-to-parallel (S/P) converter, a discrete Fourier transform (DFT), and an M-branch polyphase network. The frequency responses of the polyphase filters are given by $G^{(i)}(f) = H^{(M-1-i)}(f)$, $i=0, \ldots, M-1$. All filtering operations are now performed at the low rate 1/T. Note that the computationally more efficient inverse fast Fourier transform and fast Fourier transform are used in practice instead of IDFT and DFT, further reducing system complexity. The efficient implementation of an OFDM system is illustrated in FIG. 3. For example, DMT and DWMT are variants of baseband OFDM that can be considered for practical applications.

OFDM systems and single-carrier QAM systems achieve the same theoretical performance for transmission over additive white Gaussian noise (AWGN) channels. In practice, however, OFDM offers several advantages over QAM:

- Provision of excess bandwidth, which for QAM systems is usually non-negligible, e.g. 25% for upstream transmission in HFC networks, is not required.
- The bandwidth used for transmission can be adjusted in increments of 1/T Hz and optimized for each individual channel and over a wide range of data rates. Furthermore, if the noise exhibits strong spectral components over certain frequency regions, the total band can be split into two or more subbands.
- In multiple-access systems, the much finer granularity of OFDM systems allows higher flexibility in the spectrum allocation.
- OFDM systems provide more robustness against impulse noise. If the expected rate of occurrence of the impulses is less than the modulation rate, an additional margin against impulse noise of approximately $10 \log_{10}(M)$ can be assumed.
- For large M, using FFT-based polyphase filter banks, the complexity required to implement M N-tap filters that operate in parallel at rate 1/T is substantially lower than that required to implement one N-tap filter at rate M/T.

2.4 Discrete multitone (DMT) and discrete wavelet multitone (DWMT) modulation schemes An OFDM system is considered where transmit and receive filter banks are realized using the prototype filter with impulse response given by $$h_n = \begin{cases} 1 & \text{if } 0 \leq k \leq M-1 \\ 0 & \text{otherwise} \end{cases} \quad (6).$$

It is noted that the prototype filter impulse response given by (6) is characterized by $\square=1$ and the impulse responses of the polyphase components are given by $h_l^{(i)} = \delta_l$, $\forall i$. Therefore the polyphase networks become trivial, and we obtain the system depicted in FIG. 4. It is assumed that M is even, and that each block of input symbols satisfies the Hermitian symmetry conditions, i.e., $A_n(0)$ and $A_n(M/2)$ are real valued, and $A_n(i)=A_n(M-i)$, $i=1, \ldots, M/2-1$. Then the signals $a_n$ that are obtained at the output of the IDFT are real valued. After parallel-to-serial conversion, the M signals are sent over the channel, which is assumed noiseless and ideal, at the given transmission rate M/T. The signals are then received without noise and distortion. Serial-to-parallel conversion yields blocks of M elements, with boundaries placed such that each block obtained at the modulator output is also presented at the demodulator input. Demodulation performed by a DFT will reproduce the blocks of M input symbols. FIG. 5 shows the frequency responses of three contiguous subchannel filters obtained for M=64. Note that spectral components of signals on adjacent subchannels exhibit significant overlap, owing to the choice of a rectangular impulse response for the baseband prototype filter. However, as a consequence of the orthogonality conditions (2), which are in this case satisfied, the overall input-output relationship is equivalent to that of a bank of M parallel subchannels without intersymbol interference (ISI) as well as ICI.

In the general case of a noisy channel with impulse response having length greater than one, M independent subchannels are obtained by a variant of OFDM that is also known as discrete multitone modulation (DMT). In a DMT system, which is shown in FIG. 6, the polyphase networks are also omitted as in the previous example. Modulation by the IDFT, however, is performed at the rate 1/T'=M(M+L) T<1/T. After modulation each block of M signals is cyclically extended by copying the last L signals in front of the block, and converted from parallel to serial. The resulting L+M signals are sent over the channel. At the receiver, blocks of samples with length L+M are taken. Block boundaries are placed such that the last M samples depend only on the elements of one cyclically extended block of signals. The first L samples are discarded, and the vector $Y_n$ of the last M samples of the block received at the n-th modulation interval can be expressed as $$y_n = \Gamma_n h_{ch} + u_n, \quad (7)$$

where $h_{ch}$ is the vector of the impulse response extended with M−L−1 zeros, $u_n$ is a vector of additive white Gaussian noise samples, and $\square_n$ is M×M circulant matrix given by $$\Gamma_n = \begin{vmatrix} a_n(0) & a_n(M-1) & \ldots & a_n(1) \\ a_n(1) & a_n(0) & \ldots & a_n(2) \\ \ldots & \ldots & \ldots & \ldots \\ a_n(M-1) & a_n(M-2) & \ldots & a_n(0) \end{vmatrix}, \quad (8)$$

Recalling that $\Im_M \Gamma_n \Im_M^{-1} = \text{diag}(A_n)$, where $\Im_M = [W^{mi}]$, m, i=0, ..., M−1, denotes the M×M DFT matrix, and diag($A_n$) denotes the diagonal matrix with elements on the diagonal given by $A_n$, we find that the output of the demodulator is given by $$Y_n = \text{diag}(A_n) H_{ch} + U_n \quad (9)$$

where $H_{ch}$ and $U_n$ are the DFT of the vectors $h_{ch}$ and $u_n$, respectively. Equation (9) indicates that the sequence of transmitted symbol vectors can be detected by assuming a bank of M independent subchannels, at the price of a decrease in the data rate by a factor (M+L) 1M. It is therefore essential that the length of the channel impulse response be much less than the number of subchannels, so that the reduction in data rate due to the cyclic extension may be considered negligible. In practice, equalization must be adopted to shorten the length of the channel impulse response.

In DMT systems, the penalty in data rate by the factor (M+L) 1M, and the consequent need to reduce this penalty by shortening the channel impulse response, are to be attributed to the large amount of spectral overlap between contiguous subchannels. To avoid these difficulties, a scheme may be adopted where the FIR prototype filter is designed such that a high level of subchannel spectral containment is achieved and conditions (2) are satisfied. These objectives are achieved by OFDM systems that have recently been referred to as discrete wavelet multitone (DWMT) systems. In a DWMT system, the elements of the input vector $A_n$ are real-valued symbols, and the impulse responses of the M filters in the transmit and receive filter banks are also real valued. An efficient implementation of the transmit and receive polyphase filter banks is in this case achieved by the inverse discrete cosine transform (IDCT) and the discrete cosine transform (DCT). FIG. 7 shows the frequency responses of six contiguous subchannel filters obtained for M=64 and $\square=8$.

Now, the case of upstream transmission in HFC networks using DMT or DWMT will be considered: Assuming that upstream transmission in an HFC network is based on OFDM or DWMT type. As explained above, a DWMT signal is generated by real-valued input symbols and real-valued filter impulse responses, so that the signal spectrum has Hermitian symmetry around the frequency. In principle the passband signal can be obtained by single-side band (SSB) modulation, or, using a phase-splitter filter with an appropriate spectral roll-off across, by vestigial side-band (VSB) modulation. SSB and VSB modulation schemes are currently used, e.g., for the broadcast of analog video signals, and may also be considered for data communications. SSB and VSB, however, are characterized by inferior performance as compared to systems where all signal spectral components are transmitted, e.g., QAM systems, owing to the difficulties that these schemes present for carrier-phase recovery.

To obviate this problem, pilot tones are usually employed to provide carrier-phase information. Transmission of pilot tones, however, would not be practical in the multiple-access environment we are considering.

Assuming now that upstream transmission in an HFC network is based on OFDM of DMT type. In this case, it is not necessary that a real baseband DMT signal is obtained after serial-to-parallel conversion. By removing the constraint that the complex input-symbol vectors satisfy the Hermitian symmetry conditions, we get a complex baseband DMT signal. Then the passband signal can in principle be obtained by double-side band amplitude and phase modulation (DSB-AM/PM) with zero excess bandwidth. Carrier-phase recovery does not represent a problem in this case. It is to be noted, however, that DMT systems as explained above require that the channel impulse response be shortened, so that the length of the cyclic extension is small compared to the modulation interval.

In a multiple access environment, the impulse responses of all the individual channels must be shortened: More important, even if a cyclic extension of sufficient length is used, orthogonality holds only if the individual subchannel signals are received in proper synchronism. Because of the large amount of spectral overlap between contiguous subchannels, reception of a signal with improper timing phase results in ICI, i.e., the signal will disturb several other subchannel signals and vice versa. This situation cannot be avoided when a cable modem sends a request for registration in a subchannel specified by the HC, without any prior knowledge of the correct timing phase and transmit power level.

BRIEF DESCRIPTION OF THE DRAWINGS

For a better understanding of the invention, some aspects of the art require an explanation; this explanation as well as key concepts of the invention will now be discussed with reference to the enclosed drawings in which:

FIG. 2 is another block diagram of an OFDM system employing uniform filter banks; FIG. 2a represents the general scheme while

FIG. 3 is a block diagram of an OFDM system with efficient implementation;

FIG. 4 is a further block diagram of an OFDM with prototype filter impulse response given by a rectangular window of duration T;

DESCRIPTION OF THE PREFERRED EMBODIMENT OF THE INVENTION

According to a first embodiment, a digital communications network according to the invention comprises fiber cables which are connected over fiber nodes with coaxial-cables. A fiber node includes means to convert a signal from the optical domain (fiber) to the electrical domain (coax). The coaxial cables are branched using splitters to cover a so falled "fiber serving area". The branches represent feeder coaxial cables. A station is connected to a feeder cable using a tap and a short drop cable. Signals for upstream and downstream transmission over coaxial cables are amplified by bi-directional split-band amplifiers. A HC sends a downstream signal over a fiber cable and over the connected coaxial cables to all stations in a fiber serving area. Frequencies in the 50–860 MHz band are usually considered for down-stream transmission over coaxial cables. The stations in a fiber serving area send upstream signals over the coaxial cables and over the connected fiber cable to the HC. Frequencies in the 5–42 MHz band are usually considered for upstream transmission over coaxial cables.

According to another preferred embodiment, when a station becomes active, it will first tune its receiver to a downstream channel in which the HC sends MAC information, in addition to data, and establish a local time base slaved to the time base of the HC. The station monitors the downstream MAC information for an invitation to register with the HC. The station then transmits a ranging request message over the upstream subchannel specified by the HC using an OFDM transmission technique that yields a high level of spectral containment of individual subchannels, and further increasing the high level of spectral containment of individual subchannels by repetition coding. These measures allow the transmission of a ranging request message from a station that is not yet registered without disturbing the upstream transmission of registered stations over adjacent subchannels.

Detailed Explanation of the Invention

Figure 1:
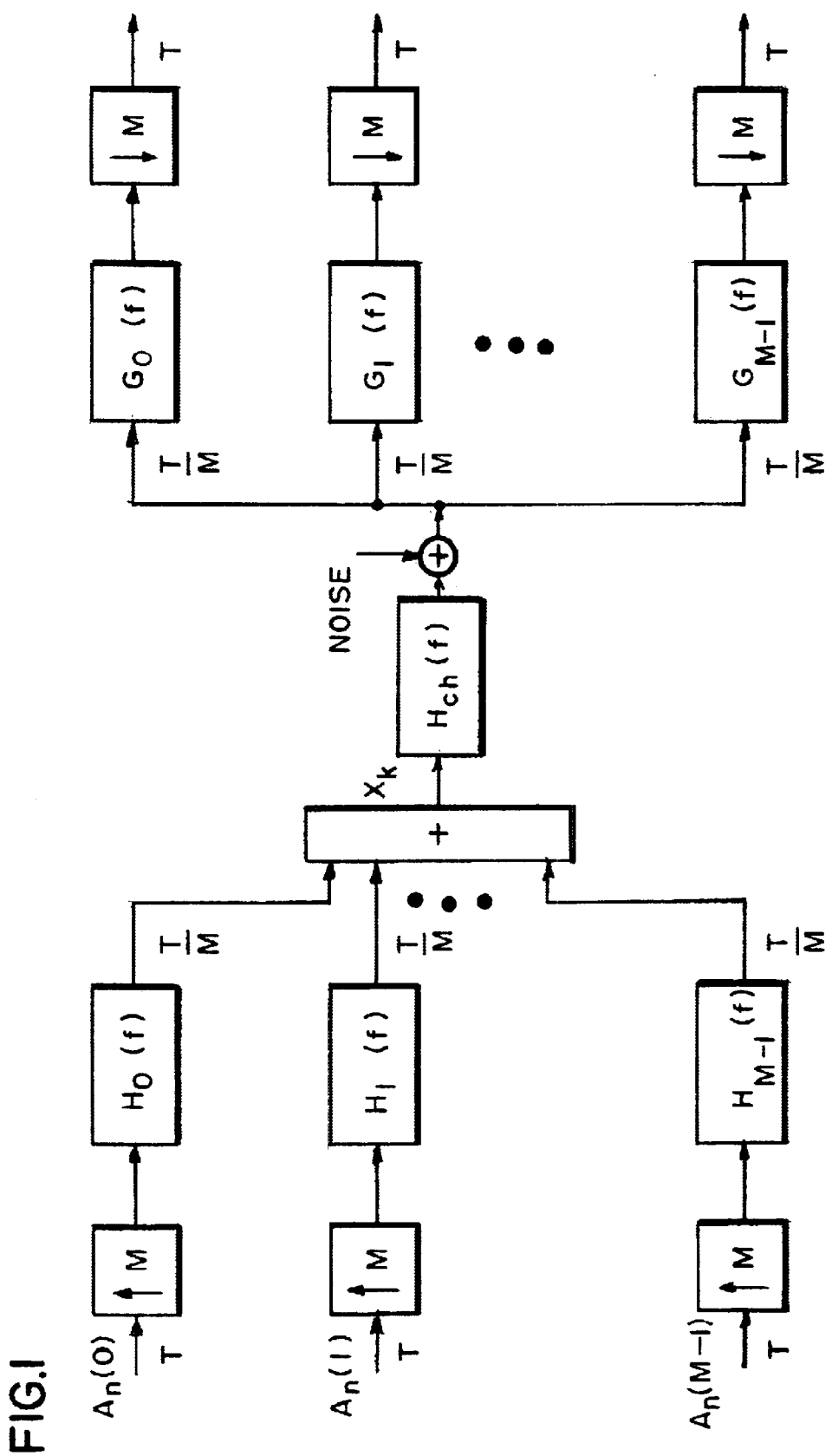
FIG. 1 is a block diagram of a prior art OFDM system.
Figure 2A:
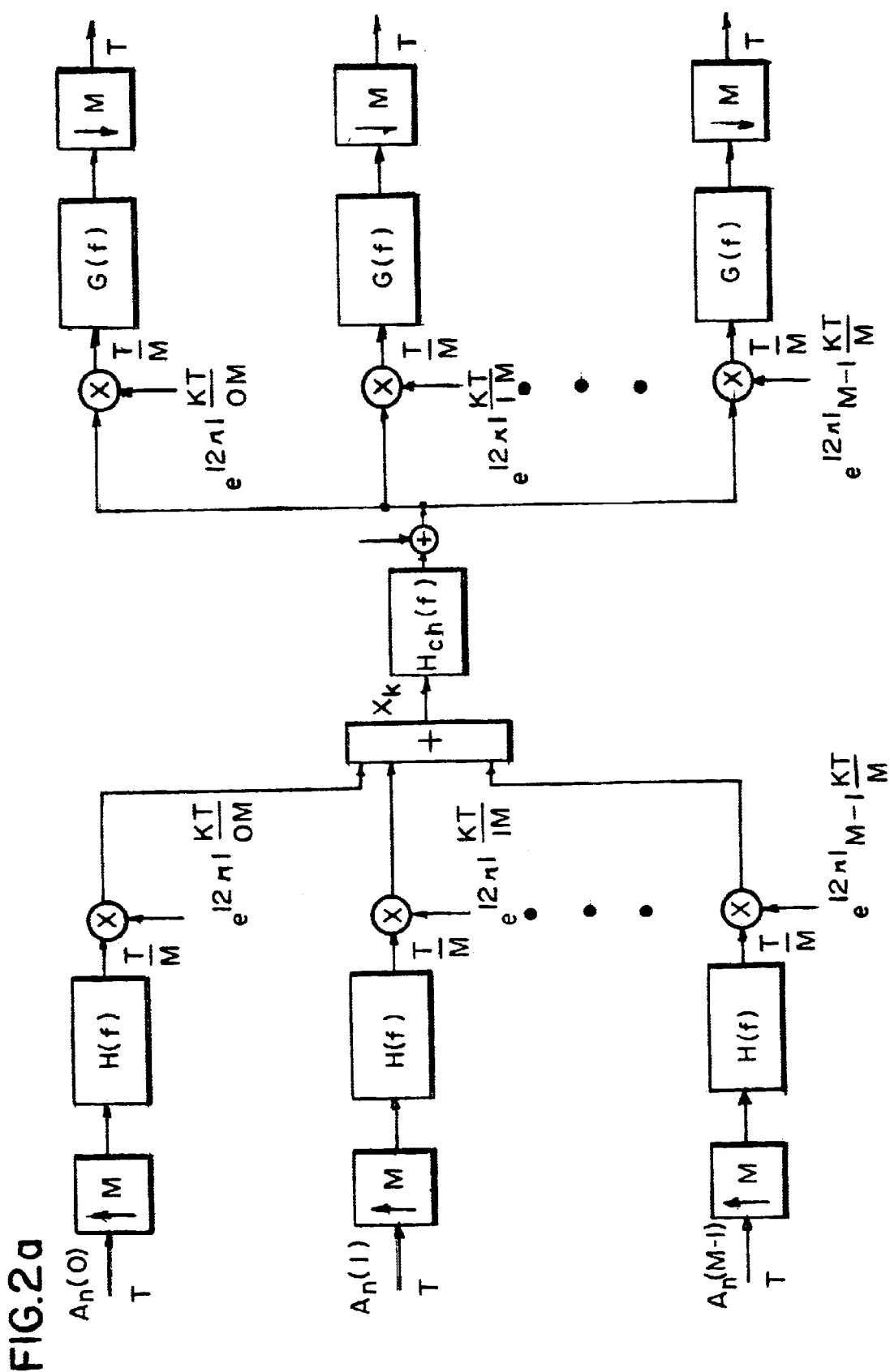
Figure 2B:
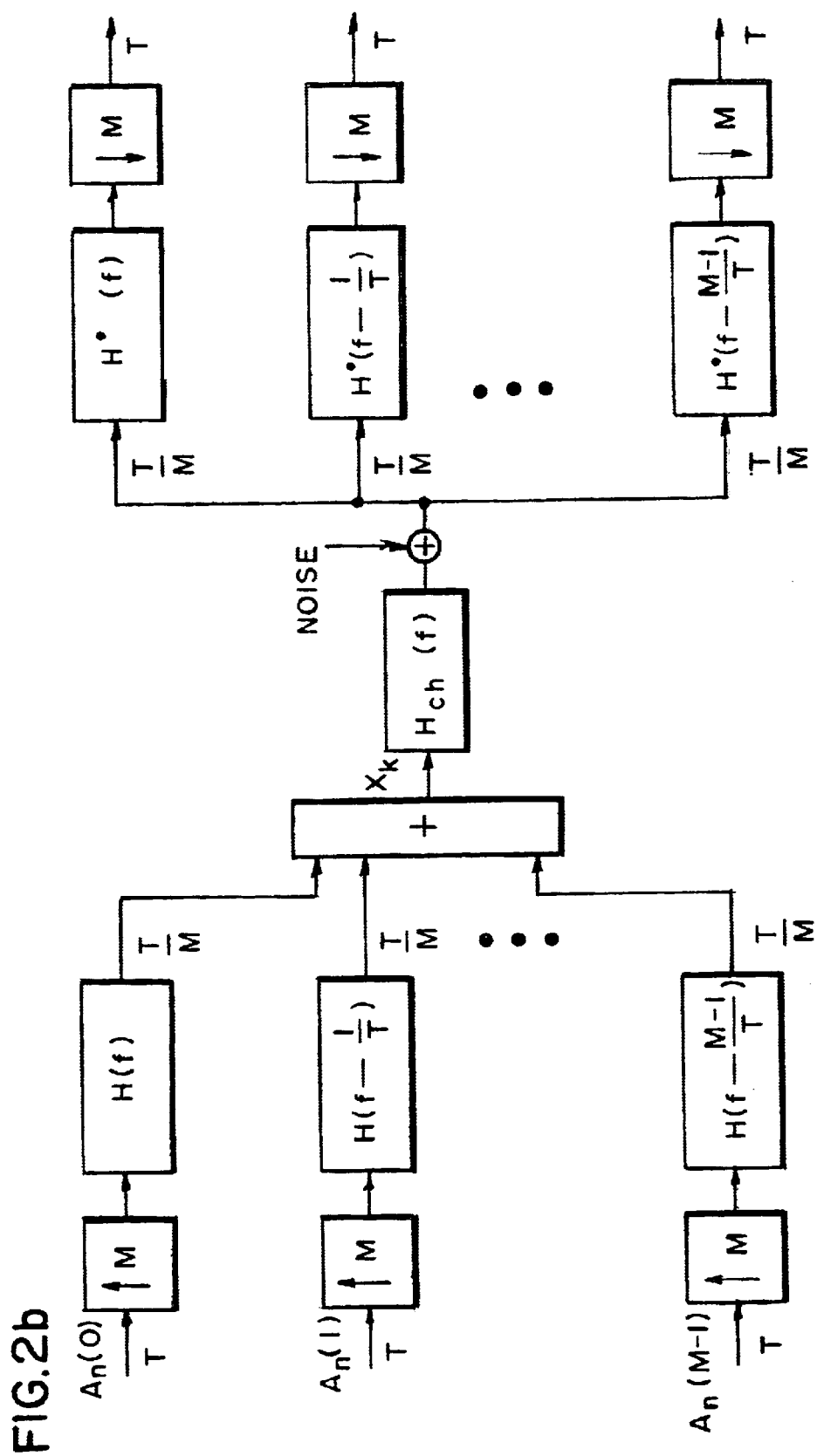
FIG. 2b shows the equivalent scheme obtained for $f_i=i/T, \ldots, M-1$ and matched FIR prototype filters.
Figure 5:
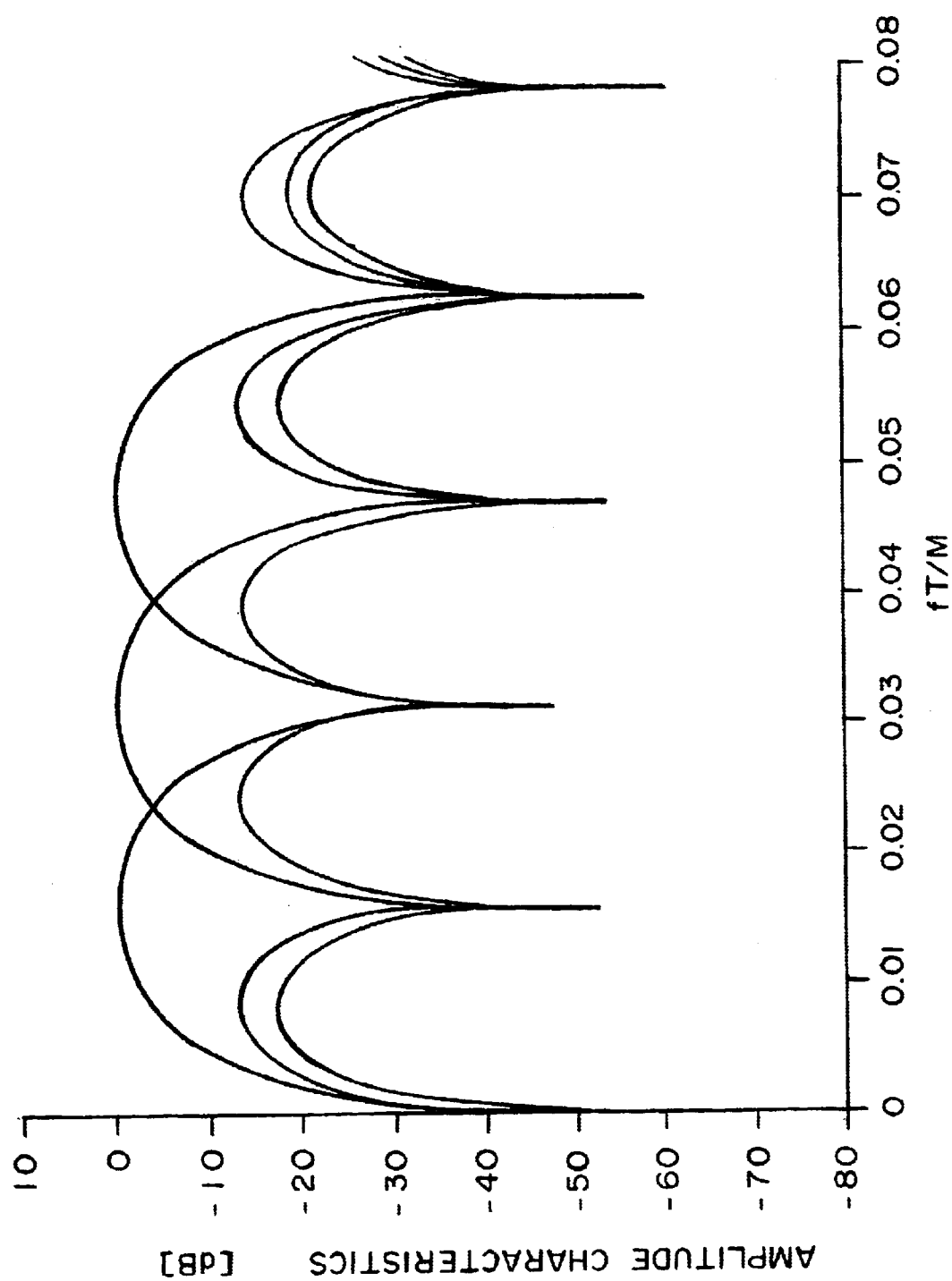
FIG. 5 is a graph or plot of frequency responses of three contiguous subchannel filters in a DTM system with M=64; the amplitude indicates the amplitude characteristics in dB while the fT/M-ratio is indicated on the abscissa.
Figure 6:
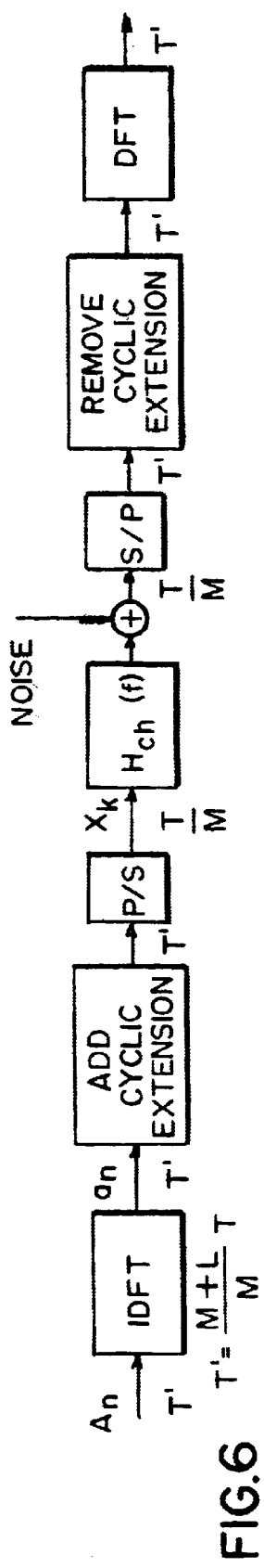
FIG. 6 is a block diagram of a DTM system.
Figure 14:
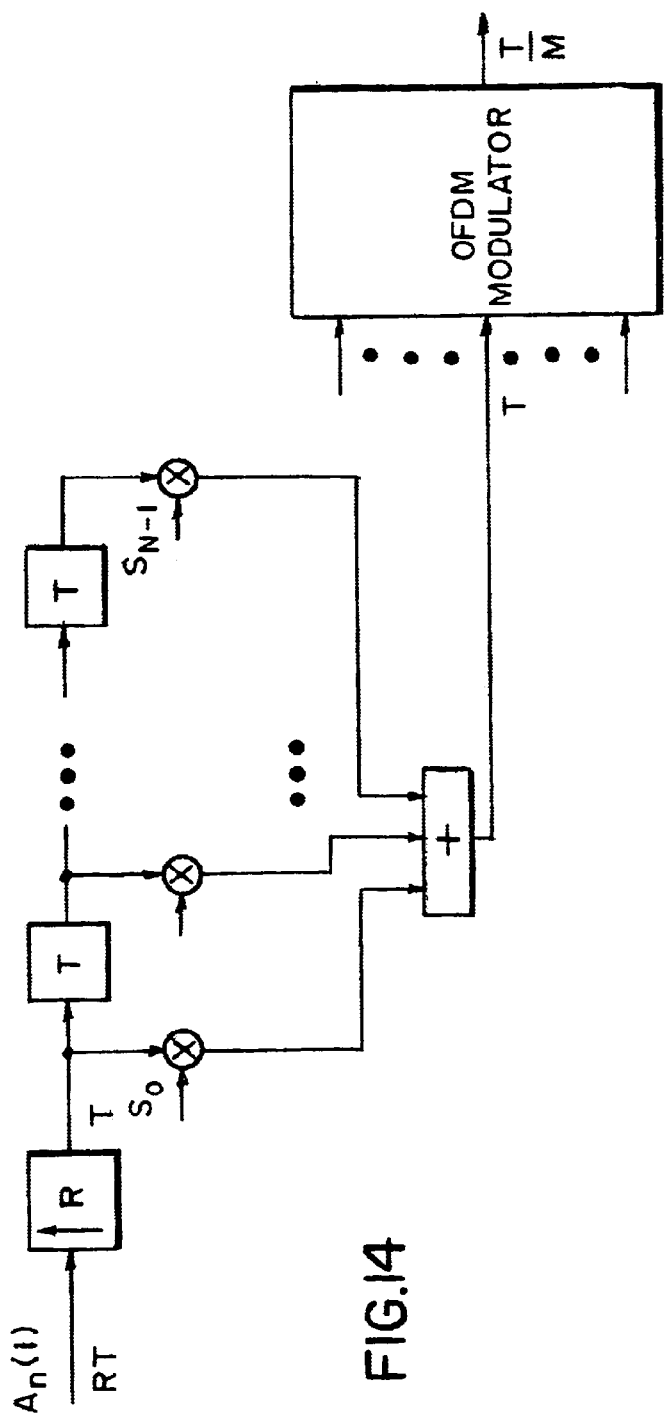
Figure 7:
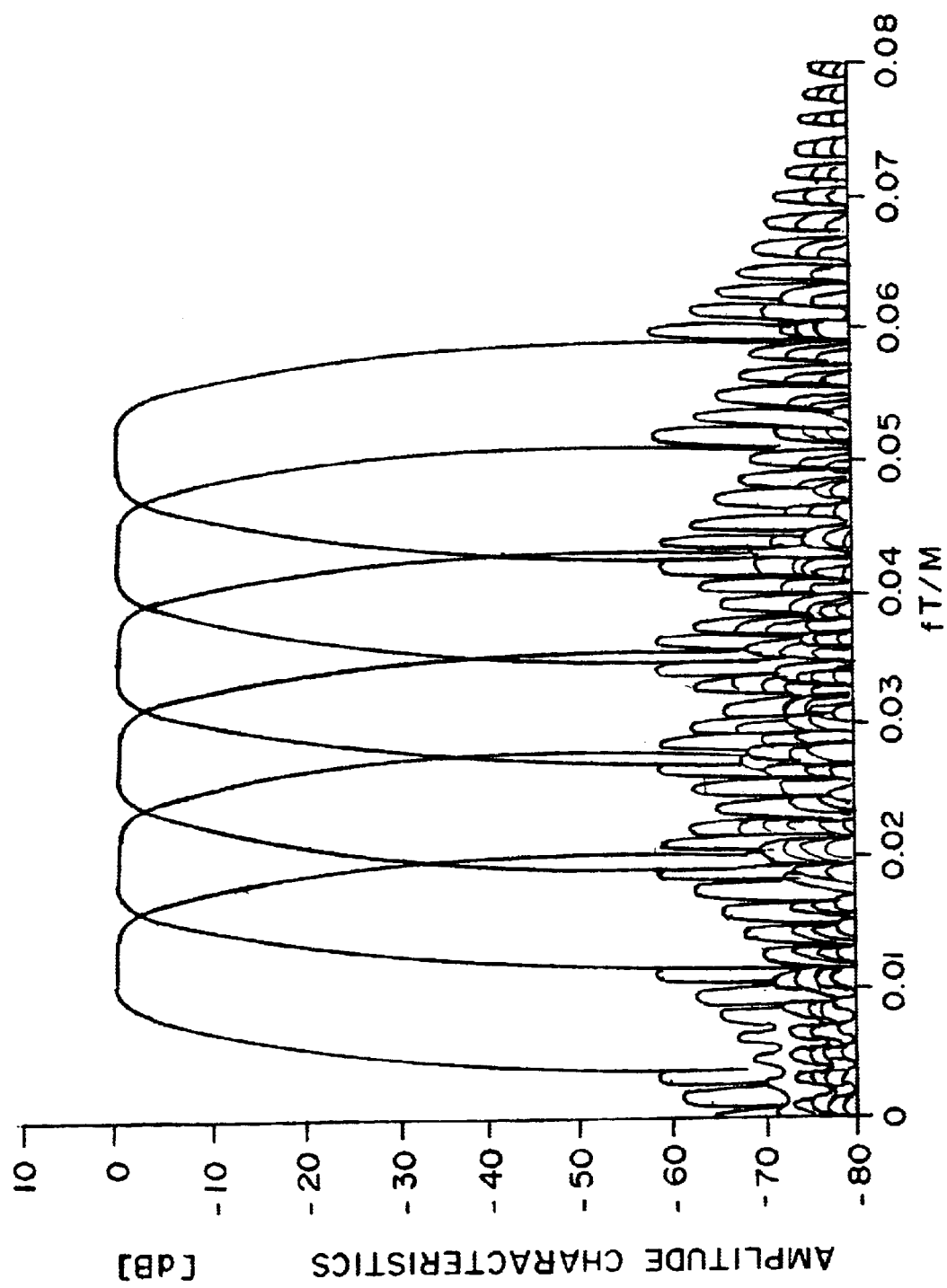
FIG. 7 is a graph similar to that of FIG. 5 showing the frequency responses of six contiguous subchannel filters in a DWMT system with M=64 and prototype filters designed for g=8.
Figure 8:
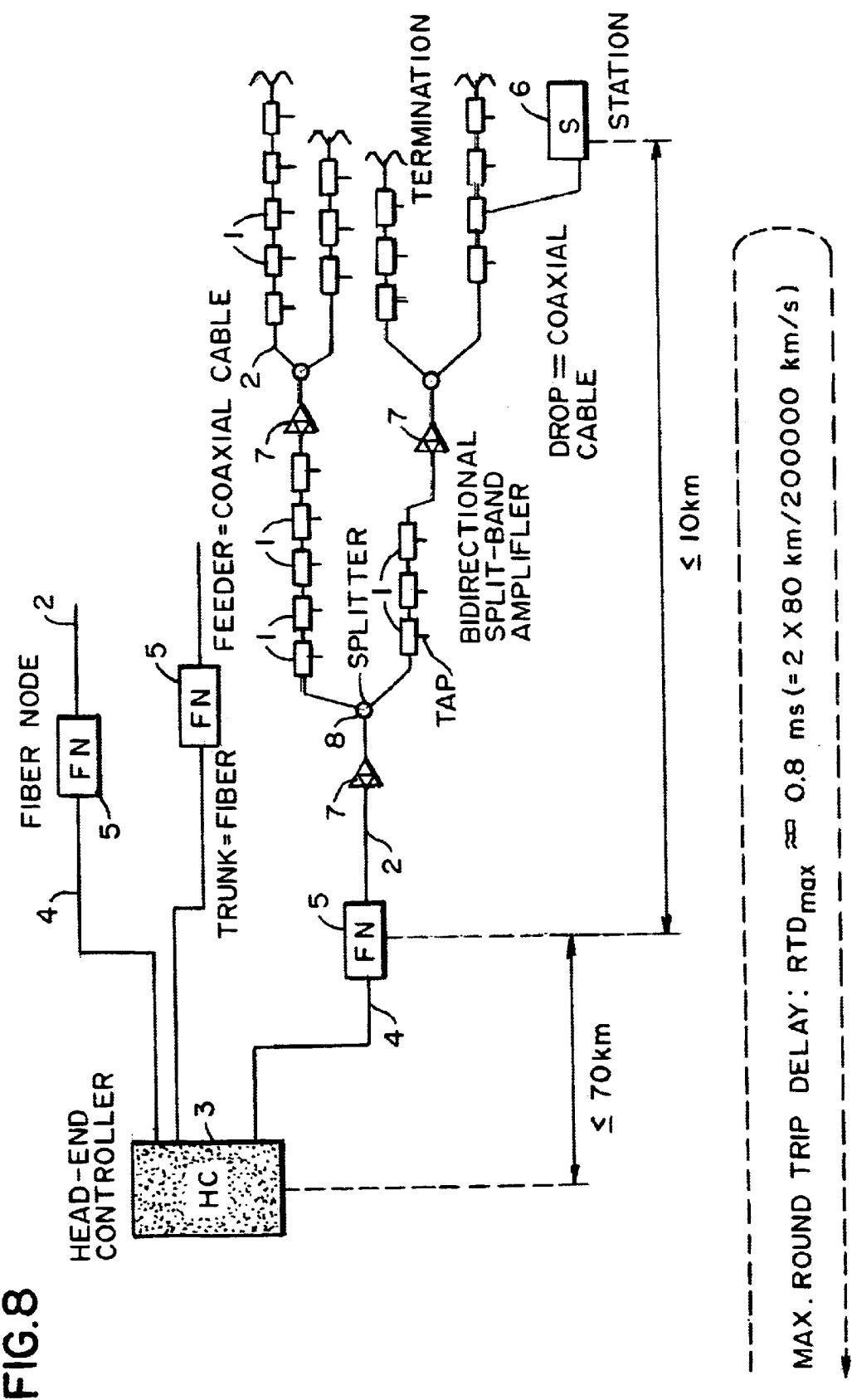
FIG. 8 is a HFC network topology according to a preferred embodiment of the invention.

The invention in a first general embodiment thereof addresses a digital communications network system with a head-end controller (HC) 3 and stations 6, as shown in FIG. 8. Stations 6 are connected to the head-end controller 3 over coaxial cables 4, 9, taps 1, bi-directional split-band amplifiers 7, splitters 8, fiber nodes 5 and fiber cables 4.

A station sends data and requests for channel resources allocation over an upstream channel to the HC by employing an orthogonal frequency division multiplexing (OFDM) transmission scheme, such that transmission of a registered station over a subchannel does not disturb the transmission of other registered stations over adjacent subchannels.

Figure 9:
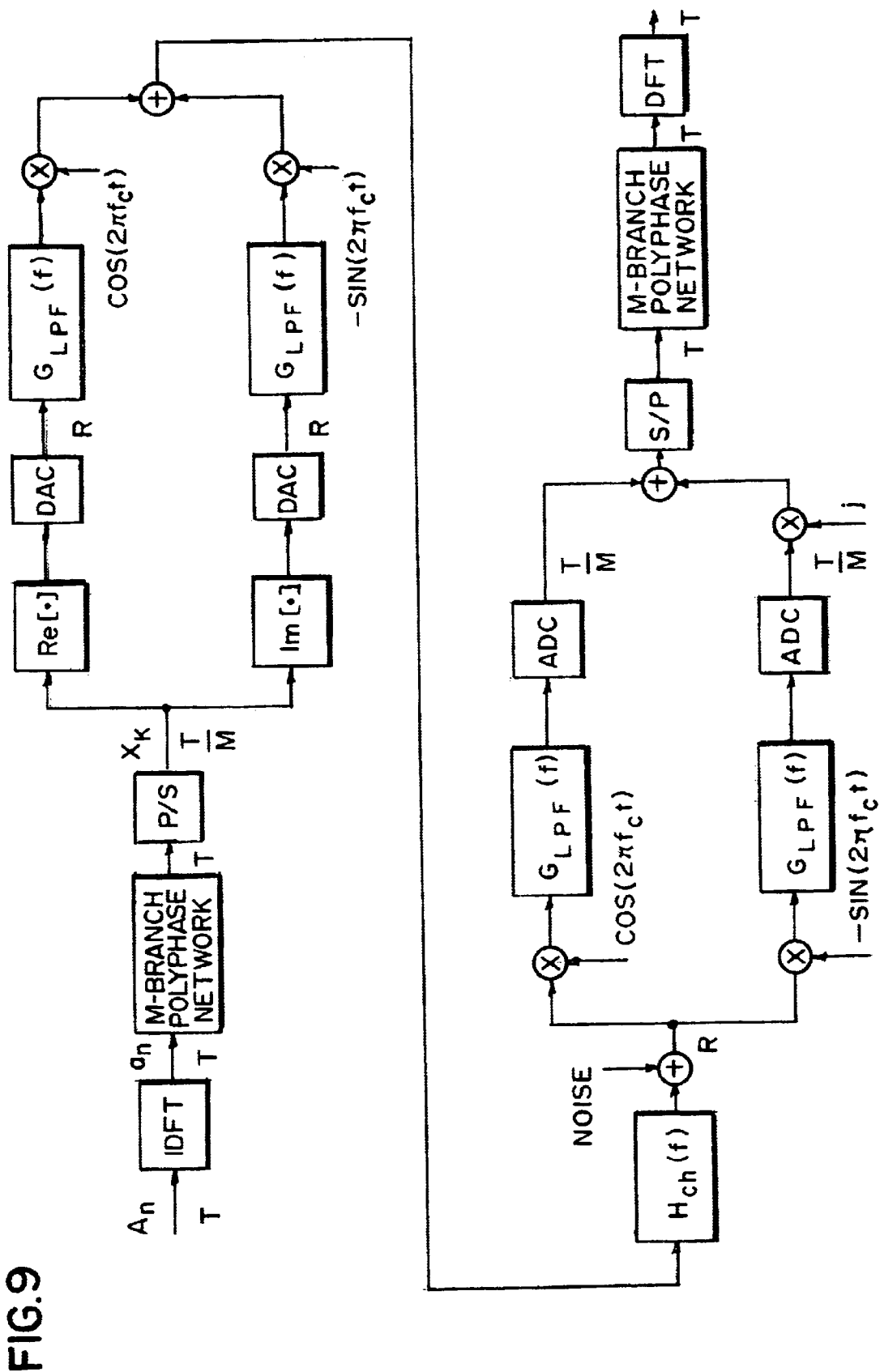
FIG. 9 is a block diagram of a passband OFDM system based on a DFT polyphase filter bank according to another embodiment of the invention.

To solve the problem of ranging and power adjustment of a station according to a preferred embodiment of the invention, an OFDM scheme where a high level of subchannel spectral containment is achieved is employed. Specifically, reference is made to the scheme of FIG. 9. The complex-valued input symbols are chosen from M, in general not identical, QAM constellations at the modulation rate 1/T. The complex signals obtained at the output of the IDFT are processed by an M-branch polyphase network. The M filter outputs are converted from parallel to serial to yield the complex baseband OFDM signal at the transmission rate M/T. The i-th subchannel can be considered as a prototype baseband channel that is translated in frequency by i/T Hz. Linear-phase FIR prototype filters are preferably employed, whose amplitude characteristics approximate an ideal minimum-bandwidth filter with transfer function given by $$Hideal(f) = \begin{cases} 1 & \text{if } -\frac{1}{2}T \le f \le \frac{1}{2}T \\ 0 & \text{otherwise} \end{cases}$$

Figure 10:
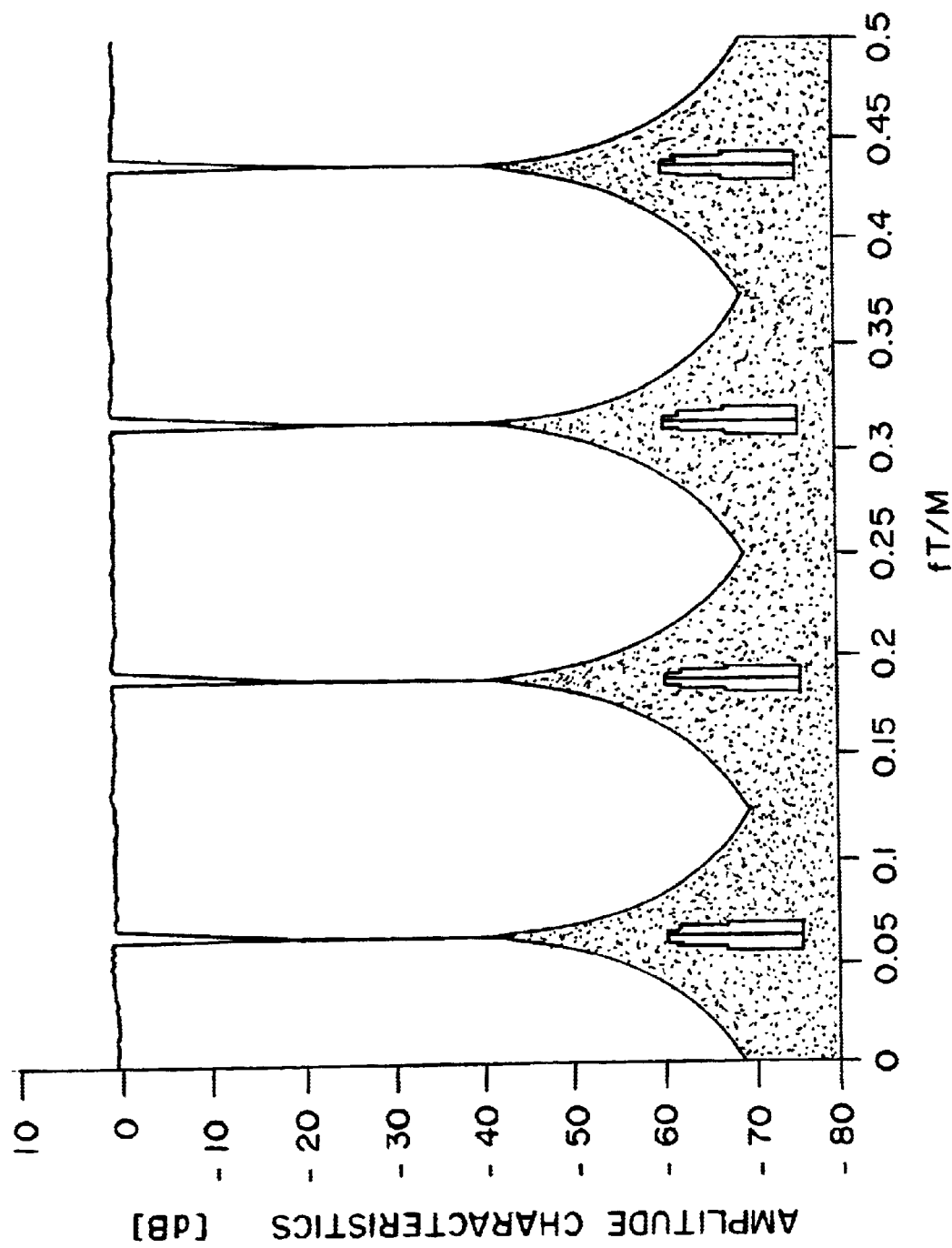
FIG. 10 is a graph similar to that of FIGS. 5 and 7 showing frequency responses of subchannel filters in an OFDM system according to the invention with M=8 and a prototype filter designed for y=64.
Figure 11:
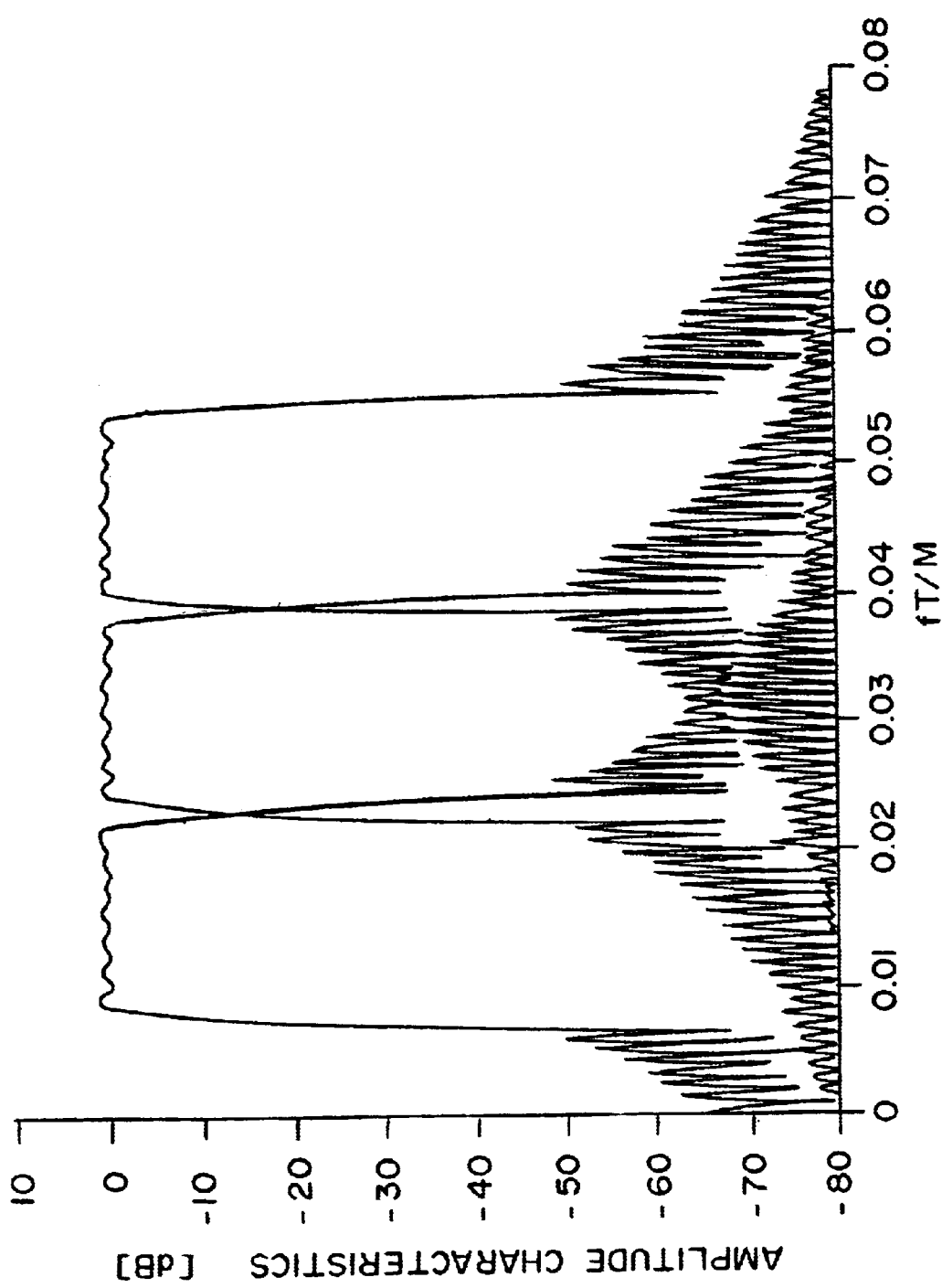
FIG. 11 is a graph similar to that of FIG. 10 showing frequency responses of three contiguous subchannel filters in an OFDM system with M=64 and prototype filters designed for y=16.

The frequency responses of subchannel filters for M=8 and =64 are shown in FIG. 10. Similarly, for M=64 and =16, three adjacent spectral subchannel responses are shown in FIG. 11.

The discrete-time real and imaginary parts of the signal are converted by D/A converters to analog signals, which are input to a DSB-AM/PM modulator with the carrier frequency. The resulting signal is transmitted over the upstream channel. The signal at the receiver input is translated to baseband by a DSB-AM/PM demodulator. The obtained in-phase and quadrature signal components are sampled at the rate M/T to yield the real and imaginary parts of the received OFDM signal. The signal is converted from serial to parallel, and filtered by an M-branch polyphase network that is followed by a DFT. If an OFDM scheme yielding a high level of subchannel spectral containment is employed, residual ICI can be considered negligible even for moderate lengths of the prototype filter. For example, Table I indicates signal-to-ICI ratios that are obtained for an ideal channel and a prototype filter designed for M=8 and various values of the parameter g. Adaptive equalization, which is performed on the individual subchannel output sequences at rate 1/T, is needed to eliminate carrier-phase jitter and residual ISI. After per-subchannel adaptive equalization, symbol estimation takes place.

If a station has acquired the global timing reference provided by the HC, but still needs to be registered, it sends a ranging request (RNG-REQ) message at low transmission rate with a spectrum concentrated in the midband region of the specified subchannel. This is achieved by using repetition coding or other filtering means. With repetition coding, the station repetitively sends every modulation symbol R times. For example, R=4 may be used. This has two effects:

(a) The bandwidth of the subchannel signal is reduced approximately by the factor R. Consequently, a RNG_REQ message transmitted without proper round-trip delay compensation will disturb adjacent subchannels less than in the case where the signal would exhibit full bandwidth.

(b) The HC can receive a RNG_REQ message with a repetition coding gain of 10 $\log_{10}$ R dB (R=4$\leqq$6 dB) by superimposing R demodulated signals prior to making a symbol decision.

Figure 12:
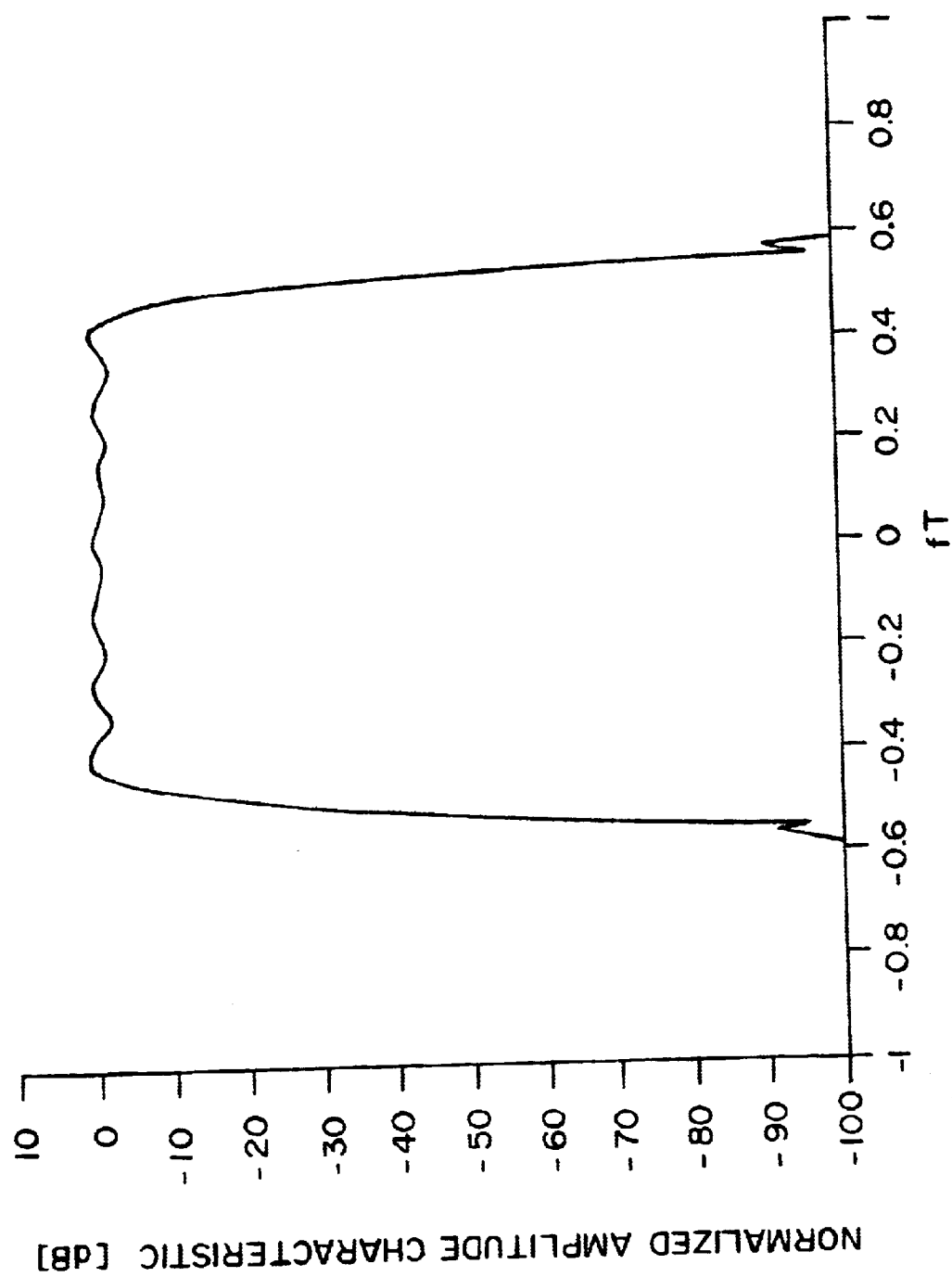
FIG. 12 is another graph similar to that of FIG. 10 showing a subchannel signal spectrum without repetition coding, for M=64 and g=16.
Figure 13:
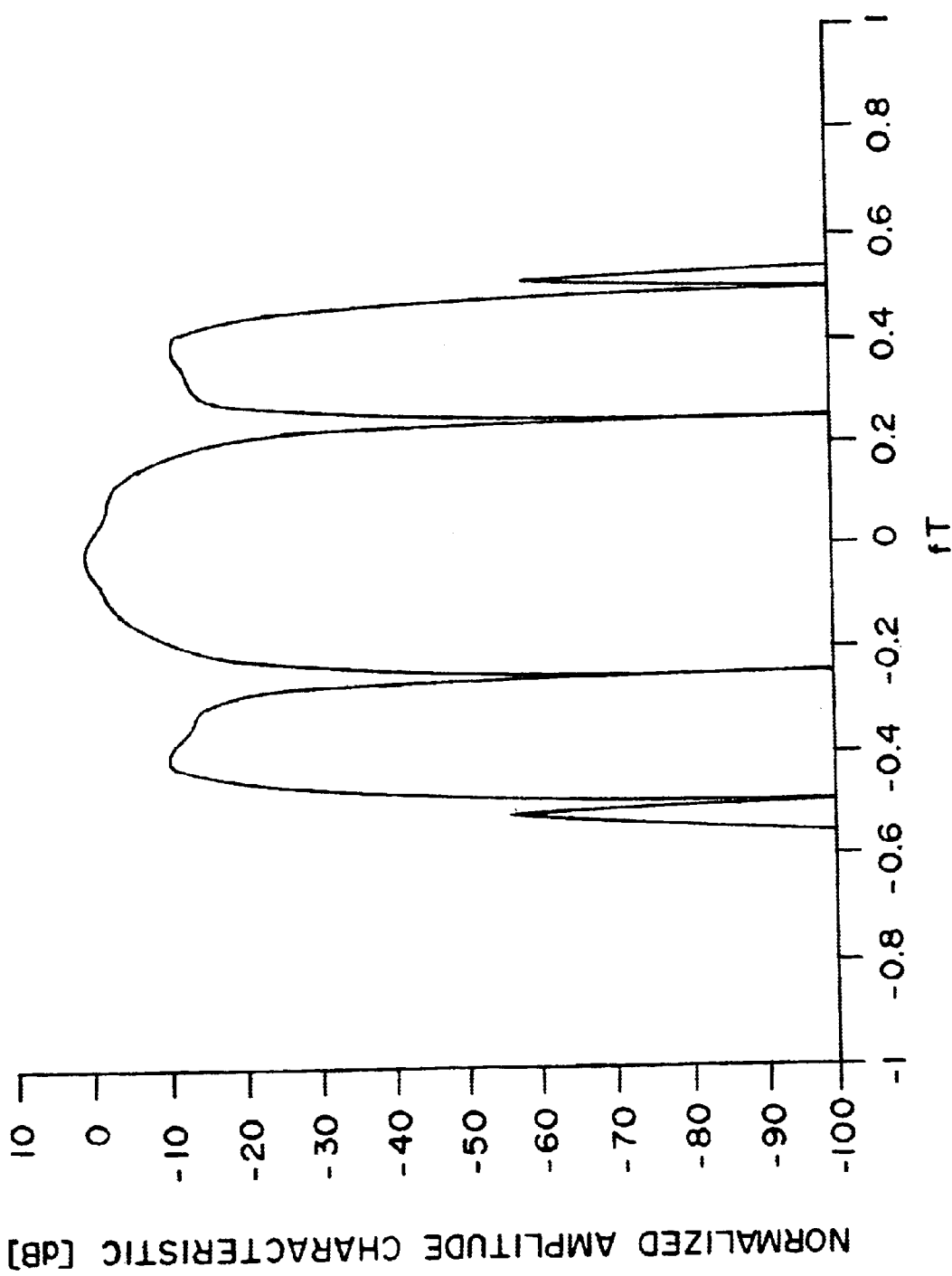
FIG. 13 is yet another graph similar to that of FIG. 10 showing a subchannel signal spectrum with repetition coding according to an embodiment of the invention for R=4, M=64 and g=16.

The HC can thus detect a RNG_REQ message at a lower signal level, where the RNG_REQ message, in combination with the effect of (a), does not significantly disturb the other subchannel signals. Repetition coding also facilitates timing and carrier-phase recovery from an upstream signal received with unknown timing and carrier phase. FIG. 12 shows the spectrum of a subchannel signal without repetition coding for an OFDM system with M=64 subchannels and a prototype filter length M=1024. For the same OFDM system parameters, FIG. 13 depicts the spectrum of a subchannel with repetition coding using a repetition factor of R=4.

Instead of using the simple method of repetition coding to achieve higher spectral containment and coding gain, a station may also employ modified filter responses for sending upstream transmission of RNG-REQ messages at the reduced rate. This method would allow a further increase of the level of spectral containment of the transmitted message, at the cost of higher system complexity.

In the remaining part of this section, we describe a possible realization of the ranging and power adjustment process using the disclosed technique. As in the case of ranging and power adjustment when single-carrier QAM is employed, a station first tunes its receiver to a downstream channel that conveys MAC information and acquires the global timing reference provided by the HC. Thereafter, when an Allocation Map (MAP) message with an Initial Maintenance IE is received, the cable modem sends a RNG-REQ message using repetition coding. If a Ranging Response (RNG-RSP) message is not received, subsequent RNG-REQ messages are sent with increasing transmit power, e.g., incremented by 1 dB steps.

For RNG-REQ messages, a station may consider a transmission format with a preamble containing a constant-amplitude zero autocorrelation (CAZAC) sequences of length K, e.g., K=16, which are repeated P times, e.g., P=8, followed by a special start-of-message (SOM) sequence. The CAZAC and SOM sequences may be specified in the MAP message.

Upon detection of the CAZAC sequence, the HC performs channel identification by a least-squares algorithm. From the amplitude and phase characteristics of the identified channel response a transmit power level adjustment and a timing phase are derived. The timing phase is needed to compute the round-trip delay compensation to receive the OFDM sub-channel signal in proper synchronism. The detection of the signature sequence provides the HC with further timing information that is used to determine the total round-trip delay from the head-end node to the station, and hence the round-trip delay compensation.

After determining the transmit power level adjustment and the round-trip delay compensation, the HC sends this information to the station as part of a RNG-RSF message. The station then waits for a MAP message with an individual Station Maintenance IE, and sends at the specified time a RNG-REQ message using the power level and timing corrections. The modulation symbols are now transmitted without using repetition coding. The HC receives this RNG-REQ message in proper synchronism at the filter-bank output. The HC returns another RNG-RSP message to the station with information about any additional fine tuning required. The ranging request/response steps are repeated until the response contains a Ranging Successful notification.

Various modifications of the above disclosed embodiments will be apparent to those experienced in the art. For example, cable means can be replace, in part or in toto, by wireless links of the type known in data transmission technology.

What is claimed is:

1. A digital communications network system for multiple access having a head-end node and at least one station node at at least another end node, said system comprising a head-end controller (HC) means (3) capable of transmitting data and medium-access control information to at least one station means (6), preferably a plurality of station means, over a set of downstream channels within a first frequency range, and receiving information from said plurality of station means over an upstream channel within a second frequency range, said upstream channel comprising at least one upstream subchannel, a plurality of upstream subchannels, said system further comprising at least one connection means, preferably a plurality of connection means, for connecting said head-end controller means(3) with said at least one station means (6), preferably a plurality of station means, wherein each of said station means (6) includes means for receiving data and medium-access control information from said head-end controller means (3), said system further including means for sending a data stream at a first signal level over at least one upstream subchannel, preferably a plurality of upstream subchannels, which station means (6) further includes means for sending at least one ranging request message to said head-end controller means (3) over at least one upstream subchannel, said at least one ranging request message having a signal level that is lower than said first signal level of said data stream, and said at least one ranging request message being transmitted using repetition coding for enabling said head-end controller means to detect said at least one ranging request message having a signal level lower than said first signal level of said data stream, said repetition coding being selected for enhancing the level of spectral containment of said at least one ranging request message and reducing interference with transmissions over adjacent upstream subchannels.

2. The system of claim 1, wherein said at least one ranging request message is sent at a symbol rate lower than the symbol rate for sending said data stream, said system additionally comprising filtering means for further enhancing the level of spectral containment of said at least one ranging request message so as to enable said head-end controller means to detect said at least one ranging request message having a signal level that is lower than said first signal level of said data stream, and further reducing interference with transmissions over adjacent upstream subchannels.

3. The system of claim 1 wherein an OFDM transmission technique is employed for upstream transmission, preferably a passband OFDM transmission technique yielding a high level of spectral containment of individual subchannels.

4. The system of any of claim 1 wherein at least one first connection cable means is provided for connecting said head-end controller means with at least one cable node means, and at least one second connection cable means, preferably a plurality of second connection cable means, being provided for connecting said at least one cable node means with said at least one station means, preferably a plurality of station means.

5. The system of claim 4, wherein said first connection cable means is a fiber cable.

6. The system of claim 4, wherein said second connection cable means is a coaxial cable.

7. The system of any of claim 1, wherein at least one wireless link, preferably a plurality of wireless links, is provided for connecting said head-end controller means with said at least one station means, preferably a plurality of station means.

8. A method of operating a digital communications network system for multiple access having a head-end and at least one tail end, said system comprising a head-end controller (HC) means capable of transmitting data and medium-access control information to at least one station means, preferably a plurality of station means, over a set of down-stream channels within a first frequency range, and receiving information from said plurality of station means over an upstream channel with a second frequency range, said upstream channel comprising at least one upstream subchannel, preferably a plurality of upstream subchannels, which system further comprises at least one connection means, preferably a plurality of connection means, for connecting said head-end controller means with said at least one station means, preferably a plurality of station means, wherein each of said station means includes means for receiving data and medium-access control information from said head-end controller means, said system further including means for sending a data stream at a first signal level over at least one upstream subchannel, preferably a plurality of upstream subchannels, said station means further including means for sending at least one ranging request message to said head-end controller means over at least one upstream subchannel, said at least one ranging request message having a signal level that is lower than said first signal level of said data stream, and said at least one ranging request message being transmitted using repetition coding for enabling said head-end controller means to detect said at least one ranging request message having a signal level lower than said first signal level of said data stream, and said repetition coding being selected to enhance the level of spectral containment of said at least one ranging request message and reducing interference with transmission over adjacent upstream subchannels.

9. The method of claim 8, wherein said at least one ranging request message is transmitted at a symbol rate lower than a symbol rate for transmitting said data stream; said system further including filter means for further enhancing the level of spectral containment of said at least one ranging request message and for enabling said head-end controller means to detect said at least one ranging request message having a signal level that is lower than said first signal level of said data stream, and further reducing interference with transmissions over adjacent upstream subchannels.

10. The method of claim 8, wherein an OFDM transmission technique is employed for upstream transmission, preferably a passband OFDM transmission technique yielding a high level of spectral containment of individual subchannels.

11. The method of any of claim 8, wherein at least one first connection cable means is provided for connecting said head-end controller means with at least one cable node means, and at least one second connection cable means, preferably a plurality of second connection cable means, is provided for connecting said at least one cable node means with said at least one station means, preferably a plurality of station means.

12. The method of claim 11, wherein said first connection cable means is a fiber cable.

13. The method of claim 11, wherein said second connection cable means is a coaxial cable.

14. The method of any of claim 8, wherein at least one wireless link, preferably a plurality of wireless links, is provided for connecting said head-end controller means with said at least one station means, preferably a plurality of station means.

* * * * *